United States Patent [19]

Calundann et al.

[11] 4,083,829

[45] Apr. 11, 1978

[54] MELT PROCESSABLE THERMOTROPIC WHOLLY AROMATIC POLYESTER

[75] Inventors: Gordon W. Calundann, North Plainfield; Herbert L. Davis, Convent Station; Frederick J. Gorman, Succasunna, all of N.J.; Robert M. Mininni, Charlotte, N.C.

[73] Assignee: Celanese Corporation, New York, N.Y.

[21] Appl. No.: 789,374

[22] Filed: Apr. 20, 1977

Related U.S. Application Data

[63] Continuation-in-part of Ser. No. 686,191, May 13, 1976, abandoned.

[51] Int. Cl.$^2$ .................. C08G 63/06; C08G 63/18
[52] U.S. Cl. ..................... 260/47 C; 260/33.4 P; 260/49
[58] Field of Search ........................ 260/47 C, 49

[56] References Cited

U.S. PATENT DOCUMENTS 3,637,595  1/1972  Cottis et al. .................... 260/47 C
3,890,256  6/1975  McFarlane et al. ............. 260/47 C

*Primary Examiner*—Lester L. Lee

[57] ABSTRACT

A wholly aromatic polyester is provided which has been found to be highly amenable to melt extrusion to yield high performance fibers. Such fibers following thermal treatment exhibit high tenacity and tensile modulus properties which are well retained at elevated temperatures while exhibiting a low degree of shrinkage. Unlike wholly aromatic polyesters normally encountered in the prior art, the polymer of the present invention is not intractable and may be melt extruded with ease at temperatures below approximately 300° C., and preferably below approximately 280° C. The aromatic polyester of the present invention consists essentially of recurring units (a) p-oxybenzoyl moiety, (b) 2,6-dicarboxynaphthalene moiety, (c) symmetrical dioxy aryl moiety (as defined), and (d) isophthaloyl moiety and/or metal-dioxy phenylene moiety, and is free of units which possess ring substitution. The wholly aromatic polyester of the present invention forms an atypical thermotropic melt phase which is exhibited in the absence of ring substitution at a relatively low temperature which facilitates fiber formation with ease. The wholly aromatic polyester of the present invention following melt spinning and thermal treatment commonly can exhibit an average single filament tenacity of at least 15 grams per denier, and an average single filament tensile modulus of at least 300 grams per denier.

23 Claims, No Drawings

MELT PROCESSABLE THERMOTROPIC WHOLLY AROMATIC POLYESTER

CROSS-REFERENCE TO RELATED APPLICATION

This is a continuation-in-part of Applicants' copending U.S. Ser. No. 686,191, filed May 13, 1976 and now abandoned, entitled "Improved Melt Processable Thermotropic Wholly Aromatic Polyester Which Is Particularly Suited for Fiber Formation".

BACKGROUND OF THE INVENTION

Wholly aromatic polyester resins long have been known. For instance, p-hydroxybenzoic acid homopolymer and copolymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc. commonly have not been viable alternatives or when attempted commonly have been accomplished with difficulty. Such polymers commonly cannot be melt extruded to form nondegraded fibers. Even those wholly aromatic polymers which exhibit a melting point below their decomposition temperature commonly melt at such high temperatures that quality fibers may not be melt spun. For instance, fibers melt extruded at extremely high temperatures commonly possess a voidy internal structure and diminished tensile properties.

Representative publications which discuss wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol 15, Pages 527 to 535 (August 1974), (c) *Aromatic Polyester Plastics*, by S. G. Cottis, Modern Plastics, Pages 62 to 63 (July 1975), and (d) *Poly(p-Oxybenzoyl Systems): Homopolymer for Coatings: Copolymers for Compression and Injection Molding*, by Roger S. Storm and Steve G. Cottis, Coating Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621; 3,787,370; 3,790,528; 3,829,406; 3,890,256; and 3,975,487.

Also, it more recently has been disclosed that certain polyesters may be formed which exhibit melt anisotropy. See for instance, (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch No. 7505551, (d) West German Nos. 2520819 and 2520820, (e) Japanese No. 43-223, and (f) U.S. Pat. Nos. 3,991,013 and 3,991,014.

It is an object of the present invention to provide an improved melt processable wholly aromatic polyester which is free of ring substitution and which is particularly suited for fiber formation.

It is an object of the present invention to provide an improved melt processable aromatic polyester capable of forming a thermotropic melt phase at a temperature below approximately 300° C. preferably below approximately 280° C. even in the absence of ring substitution which readily may undergo melt extrusion.

It is an object of the present invention to provide an improved wholly aromatic polyester which exhibits a melting point well below its decomposition temperature and which may form with ease quality high performance fibers.

It is an object of the present invention to provide improved wholly aromatic polyester fibers.

It is an object of the present invention to provide wholly aromatic polyester fibers (as defined) which exhibit a high tensile strength and a high tensile modulus which are retained at elevated temperatures while also exhibiting a very low shrinkage propensity and good hydrolytic stability.

These and other objects, as well as the scope, nature and utilization of the invention will be apparent from the following detailed description.

In commonly assigned U.S. Ser. No. 686,189, filed May 13, 1976, by Gordon W. Calundann entitled "Improved Melt Processable Thermotropic Wholly Aromatic Polyester and Process for Its Production" is claimed a generic invention which is free of ring substitution wherein wholly aromatic polyester consists essentially of recurring units of p-oxybenzoyl moiety, 2,6-dicarboxynaphthalene moiety, and symmetrical dioxy aryl moiety.

SUMMARY OF THE INVENTION

It has been found that an improved melt processable wholly aromatic polyester capable of forming a thermotropic melt phase at a temperature below approximately 300° C. consists essentially of the recurring moieties I, II, III, and IV wherein:

I is 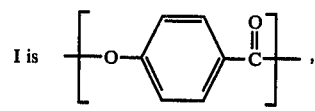

II is 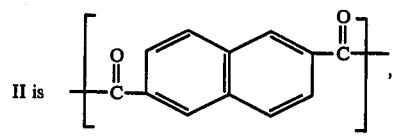

III is a symmetrical dioxy aryl moiety of the formula $$+O-Ar-O+$$

where Ar is a divalent radical comprising one or more fused or separate aromatic rings (i.e., at least one aromatic ring), and IV is selected from the group consisting of

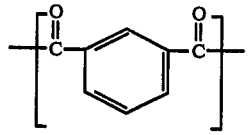 (a)

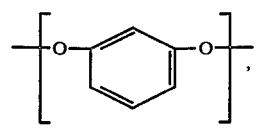  (b)

and mixtures of (a) and (b), and wherein the polyester comprises approximately 20 to 70 (e.g., approximately 40 to 70) mole percent of moiety I, approximately 3 to 30 (e.g. approximately 7.5 to 30) mole percent of moiety II, approximately 7.5 to 40 (e.g., approximately 7.5 to 30) mole percent of moiety III, and approximately 4 to 30 (e.g., approximately 4 to 20) mole percent of moiety IV, and wherein each of said moieties of the polyester is free of ring substitution.

Fibers formed of the wholly aromatic polyester of the present invention following thermal treatment exhibit relatively high tenacity and tensile modulus values which tend to be retained even at elevated temperatures.

DESCRIPTION OF THE PREFERRED EMBODIMENTS

The wholly aromatic polyester of the present invention consists essentially of at least four recurring moieties which when combined in the polyester have been found to form a polymer which is particularly amenable for melt extrusion to form fibers. The polymer exhibits an atypical thermotropic melt phase at a temperature below approximately 300° C., preferably below approximately 280° C. It has been found that the melting temperature initially exhibited by the wholly aromatic polymer following its formation may be slightly elevated above the relatively constant temperature at which it melts upon subsequent heatings of the solid polymer. Any reference to melting temperature referred to herein accordingly is with reference to such subsequent stable melting temperature exhibited by the unannealed polyester unless otherwise specified. Such stable melting temperature may be confirmed by the use of a differential scanning calorimeter employing repeat scans at a 20° C. per minute heat-up rate. Each moiety of the wholly aromatic polyester is free of ring substitutions other than the linking bonds which form the main polymer chain. Such aromatic polyester is crystalline in nature and because of its ability to exhibit ordered anisotropic properties (i.e., liquid crystals) in the melt readily can be melt processed with ease to provide highly oriented filaments directly upon spinning. The usual difficulties incurred when one attempts to melt process aromatic polyesters by conventional melt processing techniques effectively are eliminated. The melt extrusion temperature for the wholly aromatic polyester is unusually low. The aromatic polyester is considered to be "wholly" aromatic in the sense that each moiety present in the same contributes at least one aromatic ring to the polymer backbone.

The wholly aromatic polyester consists essentially of at least four moieties (as defined). Moiety I can be termed a p-oxybenzoyl moiety and possesses the structural formula:

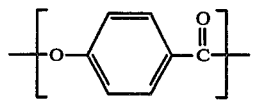

Moiety I comprises approximately 20 to 70 mole percent or approximately 40 to 70 mole percent of the wholly aromatic polyester (e.g., approximately 50 to 70 mole percent), preferably 40 to 60 mole percent, and most preferably about 60 mole percent in an embodiment identified hereafter.

The second key recurring unit (i.e., moiety II) of the wholly aromatic polyester is a 2,6-dicarboxynaphthalene moiety of the structural formula:

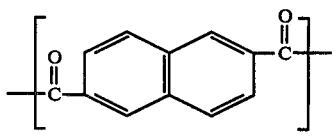

It is essential that moiety II consist of a pair of fused benzene rings as illustrated rather than a single divalent benzene ring. For instance, it has been found that if one were to substitute single benzene rings for a substantial portion of the naphthalene rings of moiety II, the properties of the resulting wholly aromatic polyester would be substantially different and adversely influenced as evidenced by substantially higher flow and melt temperatures resulting in significant degradation on processing. Commonly, moiety II comprises approximately 3 to 30 mole percent or approximately 7.5 to 30 mole percent of the wholly aromatic polyester and preferably approximately 3 to 15 mole percent or approximately 10 to 20 mole percent.

The third key recurring unit (i.e., moiety III) of the wholly aromatic polyester is a symmetrical dioxy aryl moiety of the formula ${+}O{-}Ar{-}O{+}$ where Ar is a divalent radical comprising one or more fused or separate aromatic rings (i.e., at least one aromatic ring). Moiety III is symmetrical in the sense that the divalent bonds which join the moiety to other moieties in the main polymer chain are symmetrically disposed on one or more aromatic rings (e.g., are para to each other or diagonally disposed when present on a naphthalene ring). Commonly, moiety III comprises approximately 7.5 to 40 mole percent or approximately 7.5 to 30 mole percent of the wholly aromatic polyester, and preferably approximately 15 to 30 mole percent (e.g., approximately 15 to 20 mole percent) or approximately 20 to 30 mole percent. Preferred moieties which may serve as the symmetrical dioxy aryl moiety in the wholly aromatic polyester of the present invention include:

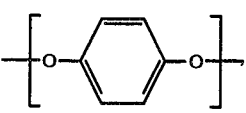

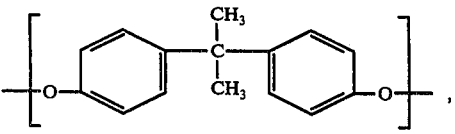

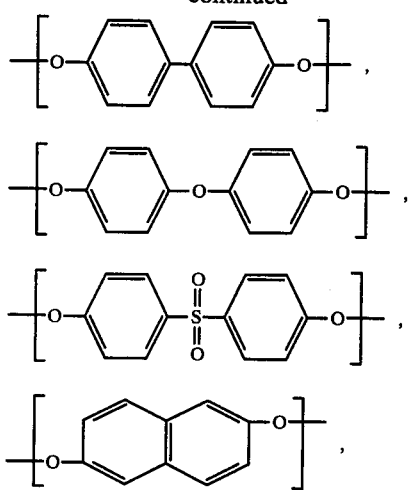

and mixtures of the foregoing.

The particularly preferred moiety III is

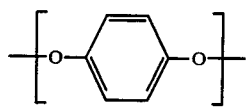

The fourth key recurring unit (i.e., moiety IV) of the wholly aromatic polyester is selected from the group consisting of

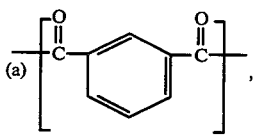

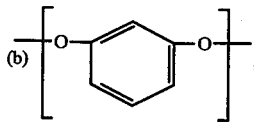

and mixtures of (a) and (b). Moiety IV is non-symmetrical in nature. Unit (a) can be termed an isophthaloyl moiety and be derived from isophthalic acid. For the reasons previously indicated terephthaloyl moiety is not contemplated since such moiety has been found to adversely influence properties as indicated by an elevated melting temperature which renders the resulting polymer difficult to melt process in the absence of undesirable polymer degradation. Unit (b) can be a meta-dioxyphenyl moiety and be derived from resorcinol. Commonly moiety IV comprises approximately 4 to 30 mole percent or approximately 4 to 20 mole percent of the wholly aromatic polyester, and preferably approximately 5 to 10 mole percent or approximately 10 to 27 mole percent. When unit (b) is selected, it commonly is employed in a lesser concentration than if unit (a) had been selected.

Other ester-forming moieties (e.g., dicarboxy or dioxy units) other than those previously discussed which are free of ring substitution additionally may be included in the wholly aromatic polyester of the present invention in a minor concentration (e.g., up to about 10 mole percent) so long as such moieties do not adversely influence the desired thermotropic melt phase exhibited by the polyester heretofore defined or raise the melting point of the polymer above approximately 300° C. As will be apparent to those skilled in the art, the total molar quantities of dicarboxy units and dioxy units present within the wholly aromatic polyester will be substantially equal. The various moieties upon polymer formation will tend to be present in a random configuration.

The wholly aromatic polyesters of the present invention commonly exhibit

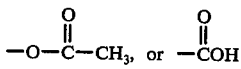

end groups depending upon the synthesis route selected. As will be apparent to those skilled in the art, the end grops optionally may be capped, e.g. acidic end groups may be capped with a variety of alcohols, and hydroxyl end groups may be capped with a variety of organic acids. For instance, end capping units such as phenylester

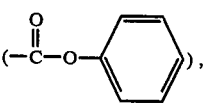

and methylester

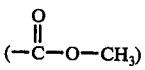

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluoroisopropanol and o-chlorophenol, and accordingly generally are not susceptible to solution processing. They can surprisingly be readily processed by common melt processing techniques as discussed hereafter, and particularly are suited for melt extrusion to form fibers. The polymer commonly is soluble in pentafluorophenol.

The wholly aromatic polyesters commonly exhibit a weight average molecular weight of about 2,000 to 200,000, and preferably about 10,000 to 25,000, e.g, about 20,000 to 22,000. Such molecular weight may be conveniently determined by standard techniques not involving the solutioning of the polymer (e.g., by end group determination via infra red spectroscopy on compression molded films), or be the testing of a solution of the polymer in pentafluorophenol via light scattering techniques, etc.

The wholly aromatic polyesters prior to heat treatment additionally commonly exhibit an inherent viscosity (i.e., I.V.) of approximately 0.5 to 7, preferably 2 to 3.3, and most preferably 2.5 to 3.1 when dissolved in a concentration of 0.1 percent by weight in pentafluorophenol at 60° C.

The wholly aromatic polyesters of the present invention can be considered crystalline in the sense that fibers melt extruded therefrom exhibit x-ray diffraction patterns, using Ni-filtered CuKα radiation and flat plate cameras, characteristic of polymeric crystalline materials, and a sharp melting point endotherm on heating and a crystallization exotherm on cooling in a differential scanning calorimeter.

Unlike the aromatic polyesters commonly encountered in the prior art the wholly aromatic polyesters of the present invention are not intractable and form a thermotropic melt phase whereby an atypical degree of order is manifest in the molten polymer. The subject polyester readily forms liquid crystals in the melt phase and accordingly exhibits a high tendency for the polymer chains to orient in the shear direction. Such thermotropic properties are manifest at an unusually low temperature which renders the polymers highly amenable to melt extrusion to form fibers. Such anisotropy in the melt may be confirmed by conventional polarized light techniques whereby crossed-polaroids are utilized. More specifically, the thermotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polaroids. The amount of light transmitted increases when the sample is sheared (i.e., is made to flow); however, the sample is optically anisotropic even in the static state. On the contrary typical aromatic polyesters do not transmit light to any substantial degree when examined under identical conditions.

The wholly aromatic polyesters of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acid halides, etc. For instance, the organic monomer compounds may be reacted in the absence of a heat exchange fluid. They accordingly may be heated via a solid phase condensation procedure wherein the naphthalene dicarboxylic acid at least initially is present as a solid with the temperature being progressively raised until it exceeds the polymer's melting point and with the reaction continuing via a melt condensation procedure. A vacuum may be applied to facilitate removal of volatiles formed during the condensation (e.g., acetic acid and water). Also a slurry system may be utilized initially with the reaction being completed in the melt.

Alternatively, as set forth in commonly assigned U.S. Ser. No. 686,189, filed May 13, 1976, of Gordon W. Calundann, entitled "Improved Melt Processable Thermotropic Wholly Aromatic Polyester and Process for Its Production" is described a slurry polymerization process which may be employed to form the wholly aromatic polyester of the present invention. In accordance with this slurry polymerization technique the product as it is formed assumes the configuration of small agglomerates of individual particles similar to those illustrated in FIGS. 1 and 2 of said application.

More specifically, in such technique, the organic monomer reactants from which the p-oxybenzoyl moiety (i.e., moiety I) and the symmetrical dioxy aryl moiety (i.e., moiety III) are derived are initially provided in a modified form whereby the usual hydroxyl groups of these monomers are esterified (i.e., they are provided as acyl esters). For instance, lower acyl esters of p-hydroxy benzoic acid wherein the hydroxy group is esterified and lower acyl diesters of aryl diols may be provided as reactants. The lower acyl groups preferably have from 2 to about 4 carbon atoms. Preferably the acetate esters of the organic compounds which form moieties I, III and IV(b) are provided. Accordingly, particularly preferred reactants for condensation with 2,6-naphthalene dicarboxylic acid are p-acetoxybenzoic acid, hydroquinone diacetate, and isophthalic acid and/or m-phenylene diacetate. If minor quantities of other aryl reactants (as previously discussed) optionally provide oxy-units within the resulting polymer, these too preferably are provided as the corresponding lower acyl esters.

Relative quantities of organic monomer reactants are provided in the reaction zone so that the potential dicarboxy units and dioxy units available for incorporation in the resulting wholly aromatic polyester are substantially equal.

In accordance with the slurry polymerization technique the reactants (e.g., p-acetoxybenzoic acid, 2,6-naphthalene dicarboxylic acid, hydroquinone diacetate and isophthalic acid and/or m-phenylene diacetate) are provided in an inert heat exchange medium which preferably serves as a solvent for at least one of the reactants. Typically, the 2,6-naphthalene dicarboxylic acid reactant is substantially insoluble in the inert heat exchange medium and is present therein as a finely divided solid. As the polymer forms, it is insoluble in the inert heat exchange medium and assumes the configuration of a fine powder as previously indentified. The heat exchange medium preferably possesses a boiling point in excess of the maximum polymerization temperature utilized. Those inert heat exchange media having boiling ranges of about 350° to 400° C. are particularly preferred. Representative heat exchange media include the terphenyls: a eutectic mixture of 73.5 percent diphenyl oxide and 26.5 percent diphenyl, commercially available from the Dow Chemical Co. under the trademark Dowtherm A; and mixtures of polychlorinated polyphenyls such as chlorinated biphenyls typified by those commercially available from the Monsanto Co. under the trademark Therminol FR; terphenyls and mixtures thereof such as those composed of meta and para isomers commercially available from the Monsanto Co. under the trademark Therminol (e.g., Therminol 88, 77, or 66); diphenylsulfone; other arylsulfones, such as substituted diphenyl sulfones (e.g., ditolylsulfone), etc. The relative quantity (weight: weight) of inert heat exchange medium to reactants in the reaction zone typically is in the ratio of heat exchange medium to total reactants of about 0.2 : 1 to 4 : 1, and more preferably about 2 : 1.

The slurry polymerization reaction may be carried out on a batch, continuous, or semicontinuous basis. Typical polymerization reactions commonly are carried out at a temperature of at least about 200° C. up to a temperature below the melting temperature or decomposition temperature of the resulting wholly aromatic polyester, e.g., at about 200° to 275° C. In a preferred embodiment of the slurry process the temperature of the slurry is increased as the polymerization reaction progresses. A gradual or stepwise temperature increase during the polymerization has been found to insure the formation of a superior product. The polymerization reaction is preferably carried out with agitation at atmospheric pressure under an inert gas blanket with the condensation reaction by-products (e.g., acetic acid) being continuously removed from the reaction zone. Superatmospheric or subatmospheric pressures optionally can be utilized usually without commensurate advantage. Typical reaction times commonly range from about 2 to 30 hours, or more, with the lesser reaction times being possible when the reaction is catalyzed.

Representative catalysts for use in the process include dialkyl tin oxide (e.g., dibutyl tin oxide), diaryl tin oxide, titanium dioxide, alkoxy titanium silicates, titanium alkoxides, the gaseous acid catalysts such as Lewis acids, hydrogen halides (e.g., HCl), alkali and alkaline earth metal salts of carboxylic acids (e.g., sodium acetate), etc. The quantity of catalyst utilized typically is about 0.001 to 1 percent by weight based upon the total monomer weight, and most commonly about 0.01 to 0.2 percent by weight.

At the conclusion of the polymerization reaction the solid particulate wholly aromatic polyester (as defined) is recovered by any convenient technique. For instance, the solid particulate polymer conveniently may be separated from the inert heat exchange medium (preferably following cooling), by decantation, centrifugation, or filtration. It is then washed, and is dried. During the washing, residual heat exchange medium adhering to the product may be removed by acetone, alcohols, lower hydrocarbons, methylene chloride, chloroform, benzene, toluene, etc., or any other relatively volatile solvent in which the heat exchange medium is soluble.

When forming fibers and films the extrusion orifice may be selected from among those commonly utilized during the melt extrusion of such shaped articles. For instance, the shaped extrusion orifice may be in the form of a rectangular slit when forming a polymeric film. When forming a filamentary material the spinneret selected may contain one and preferably a plurality of extrusion orifices. For instance, a standard conical spinneret containing 1 to 200 holes (e.g., 6 to 200 holes) such as commonly used in the melt spinning of polyethylene terephthalate, having a diameter of about 5 to 60 mils (e.g., 10 to 40 mils) may be utilized. Yarns of about 20 to 36 continuous filaments are commonly formed. The melt-spinnable wholly aromatic polyester is supplied to the extrusion orifice at a temperature above its melting point, e.g., a temperature of about 280° to 300° C.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 2 to 50, and preferably a denier per filament of about 2 to 20.

The resulting filamentary material or film optionally may be subjected to a thermal treatment whereby its physical properties are further enhanced. The tenacity of the fiber or film particularly is increased by such thermal treatment. More specifically, the fibers or films may be thermally treated in an oxygen-containing atmosphere (e.g., air) or in an inert atmosphere (e.g., nitrogen, argon or helium) with or without stress at a temperature below the polymer melting point until the desired property enhancement is achieved. The atmosphere in which the heat treatment is carried out is preferably flowing. Alternatively, the heat treatment may be carried out in a vacuum (e.g., 0.1 to 1 mm. of Hg) with or without a gaseous flow at such subatmospheric pressure. Thermal treatment times may range from a few minutes to several days, and commonly from about 1 to 6 hours. As the fiber is thermally treated, its melting temperature progressively is raised. The temperature of the atmosphere may be staged or continuously increased during the thermal treatment, or held at a constant level. For instance, the fiber may be heated at 250° C. for 1 hour, at 260° for 1 hour, and at 270° C. for 1 hour. Alternatively, the fiber may be heated at about 15° to 20° C. below the temperature at which melts for about 48 hours. Optimum heat treatment conditions will vary with the specific composition and the inherent viscosity exhibited by the wholly aromatic polyester and may be determined by routine experimentation.

The as-spun fibers formed from the wholly aromatic polyester of the present invention are fully oriented and exhibit highly satisfactory physical properties which render them suitable for use in high performance applications particularly following heat treatment. The as-spun fibers commonly exhibit an average single filament tenacity of at least about 5 grams per denier (e.g., about 5 to 11 grams per denier), an average single filament tensile modulus of at least about 300 grams per denier (e.g., about 400 to 700 grams per denier), and exhibit an extraordinary retention of physical properties and dimensional stability at elevated temperature (e.g., at temperatures of about 150° to 200° C.). Following thermal treatment (i.e., annealing) the fibers commonly exhibit an average single filament tenacity of at least 15 grams per denier (e.g., 15 to 30 grams per denier), and an average single filament tensile modulus of at least 300 grams per denier measured at ambient conditions (e.g., 72° F. and 65 percent relative humidity). Such properties enable the fibers to be used with particular advantage as tire cords and in other industrial applications, such as conveyor belts, hose, cabling, resin reinforcement, etc. Films formed of the wholly aromatic polyester of the present invention may be used as strapping tape, cable wrap, magnetic tape, electric motor dielectric film, etc. The fibers and films exhibit an inherent resistance to burning.

The following examples are presented as specific illustrations of the claimed invention. It should be understood, however, that the invention is not limited to the specific details set forth in the examples.

EXAMPLE I

To a three-neck, round bottom flask equipped with a stirrer, nitrogen inlet tube, and a heating tape wrapped distillation head connected to a condenser were added the following:
a. 151.30 grams p-acetoxybenzoic acid (0.84 mole)
b. 30.26 grams 2,6-naphthalene dicarboxylic acid (0.14 mole)
c. 54.38 grams hydroquinone diacetate (0.28 mole)
d. 23.26 grams of isophthalic acid (0.14 mole)
e. 0.4 gram dibutyl tin oxide catalyst
f. 190 grams terphenyl mixture heat exchange medium available from the Monsanto Co., under the trademark Therminol 66.

The p-acetoxybenzoic acid, the isophthalic acid, and the hydroquinone diacetate reactants were largely soluble in the heat exchange medium, and the 2,6-naphthalene dicarboxylic acid reactant remained largely suspended therein as a finely divided solid.

The contents of the flask were stirred under a slow nitrogen stream throughout the polymerization reaction. The distillation head was maintained at a temperature of about 100° to 110° C. throughout the polymerization.

The reaction slurry initially was heated to 200° C. over a period of about 20 minutes and the temperature was increased stepwise as indicated: 230° C. for 4 hours, 250° C. for 3 hours, 280° C. for 14 hours, 290° C. for 2 hours, 310° C. for 2 hours, and 335° C. for 4 hours, After about the first hour at 335° C. the product completely melts and tends to settle as a liquid layer to the bottom of the flask. Approximately 80 ml. of acetic acid distillate was collected during the condensation reaction. The polymer melt was next allowed to cool to ambient temperature (i.e., about 25° C.). Upon cooling the mass of polymer is finely ground in a Wiley Mill, extracted with acetone, and is dried in a forced air oven maintained at 130° C. for 50 to 60 minutes.

The resulting product consisted of 168 grams (i.e., about 96% of theory) of the wholly aromatic polyester.

When the product was subjected of differential scanning calorimetry, it exhibited a large sharp endotherm at about 275° C. (peak), which repeats at about 275° C. on subsequent remelt scans. The polymer exhibits a thermotropic melt phase.

When the melt was cooled in a differential scanning calorimeter at a rate of 31 20° C./min. a sharp polymer crystallization exotherm is observed at about 200° C. (peak) indicating a rapid crystallization.

The polymer was melt extruded into a continuous filament of about 9 denier per filament. More specifically, the polymer melt while at a temperature of about 290° C. was extruded through a spinneret provided with a single hole jet having a diameter of 20 mils and a length of 100 mils. The extruded filament was quenched in ambient air (i.e., at 72° F. and 65 percent relative humidity). The as-spun filament was taken-up at a rate of 150 meters per minute.

The resulting as-spun wholly aromatic polyester fiber exhibited the following average single-filament properties:

Tenacity (grams per denier): 6.41
Tensile modulus (grams per denier): 433
Elongation (percent): 1.94

Following thermal treatment in a nitrogen stream at 270° C. for 48 hours while the ends of the fiber were retained at fixed points corresponding to the length of the as-spun fiber, the fiber exhibited the following average single filament properties:

Tenacity (grams per denier): 19.4
Tensile modulus (grams per denier): 401
Elongation (percent): 5.1

The fiber also exhibited a low degree of shrinkage at elevated temperatures and a good retention of tenacity and tensile modulus values at temperatures up to about 150° to 200° C.

EXAMPLE II

Example I is repeated with the exception that the following ingredients are charged to the flask:
a. 151.30 grams p-acetoxybenzoic acid (0.84 mole)
b. 60.52 grams 2,6-naphthalene dicarboxylic acid (0.28 mole)
c. 40.78 grams hydroquinone diacetate (0.21 mole)
d. 13.59 grams m-phenylene diacetate (0.07 mole)

A wholly aromatic polyester of substantially similar properties is obtained.

EXAMPLE III

To a three-neck, round bottom flask equipped with a stirrer, nitrogen inlet tube, and a heating tape wrapped distillation head connected to a condenser were added the following:
a. 151.30 grams p-acetoxybenzoic acid (0.84 mole)
b. 30.26 grams 2,6-naphthalene dicarboxylic acid (0.14 mole)
c. 54.83 grams hydroquinone diacetate (0.28 mole)
d. 23.26 grams of isophthalic acid (0.14 mole)

This mixture was brought to a temperature of 250° C. At 250° C. the 2,6-naphthalene dicarboxylic acid and the isophthalic acid are suspended as a finely divided solid in a solution consisting of p-acetoxybenzoic acid, and hydroquinone diacetate. The contents of the flask were stirred rapidly at 250° C. under a slow stream of dry nitrogen for about 2 hours while acetic acid was distilled from the polymerization vessel. The polymerization suspension was then raised to a temperature of 280° C. and was stirred at this temperature for 3 hours under a nitrogen flow while additional acetic acid evolved. About 80 ml. of acetic acid was collected during these stages. The polymerization temperature was next increased to 320° C. The viscous polymer melt was held for 15 minutes at 320° C. under a nitrogen flow and then subjected to a series of reduced pressure stages. The nitrogen was shut off and the pressure was reduced to about 300 mm. of mercury for about 20 minutes, 210 mm. for 15 minutes, 70 mm. for 15 minutes and finally about 0.2 mm. for 10 minutes. During these periods the polymer melt continued to increase in viscosity and was stirred more slowly while the remaining acetic acid was removed from the reaction vessel. The polymer melt was next allowed to cool to ambient temperature (i.e., about 25° C.). Upon cooling, the polymer plug is finely ground in a Wiley Mill and dried in a forced air oven at 100° C. for 50 to 60 minutes.

The resulting product consisted of 169 grams (i.e., about 96% of theory) of the wholly aromatic polyester. The inherent viscosity (I.V.) of the polymer was 3.02 as determined in pentafluorophenol solution of 0.1 percent by weight concentration of 60° C.

$$I.V. = \ln (\eta_{rel})/c$$

where
$c$ = concentration of solution (0.1 percent by weight), and
$\eta_{rel}$ = relative viscosity.

When the product was subjected to differential scanning calorimetry, it exhibited a large sharp endotherm at about 280° C. (peak), which repeats at about 280° C. on subsequent remelt scans. The polymer melt is thermotropic.

When the melt was cooled in differential scanning calorimeter at a rate of −20° C./min., a sharp polymer crystallization exotherm is observed at about 200° C. (peak) indicating a rapid crystallization.

The polymer was melt extruded into a continuous filament of about 4.36 denier per filament. More specifically, the polymer melt while at a temperature of 299° C. was extruded through a spinneret provided with a single hole jet having a diameter of 20 mils and a length of 100 mils. The extruded filament was quenched in ambient air (i.e., at approximately 72° F. and 65 percent relative humidity). The as-spun filament was taken up at a rate of 690 meters per minute.

The resulting as-spun wholly aromatic polyester fiber exhibited the following average single filament properties:

Tenacity (grams per denier): 10.6
Tensile modulus (grams per denier): 596
Elongation (percent): 2.36

Following thermal treatment in an air flow at 270° C. for 2 hours while the ends of the fiber were retained at fixed points corresponding to the length of the as-spun fiber, the fiber exhibited the following average single filament properties:

Tenacity (grams per denier): 23.6
Tensile modulus (grams per denier): 438
Elongation (percent): 5.21

The fiber also exhibited a low degree of shrinkage at elevated temperatures and a good retention of tenacity and tensile modulus values at temperatures up to about 150° to 200° C.

EXAMPLE IV

Example III was substantially repeated with the exception that the following ingredients were charged to the flask:
 a. 54.04 grams p-acetoxybenzoic acid (0.30 mole)
 b. 3.89 grams 2,6-naphthalene dicarboxylic acid (0.018 mole)
 c. 29.13 grams hydroquinone diacetate (0.15 mole)
 d. 21.93 grams isophthalic acid (0.132 mole),
and the resulting as-spun fiber was taken up at a rate of 150 meters per minute.

When the product was subjected to differential scanning calorimetry, it exhibited an endotherm at about 300° C. (peak), which repeats at about 300° C. on subsequent remelt scans. The polymer melt is thermotropic.

Following melt extrusion the resulting as-spun wholly aromatic polyester fiber exhibited a denier per filament of 8.96 and the following average single filament properties:

Tenacity (grams per denier): 7.55
Tensile modulus (grams per denier): 380
Elongation (percent): 2.72

Following thermal treatment in a nitrogen stream at 230° C. for 3 hours and 250° C. for 16 hours while the ends of the fiber were retained at fixed points corresponding to the length of the as-spun fiber, the fiber exhibited the following average single filament properties:

Tenacity (grams per denier): 15.7
Tensile modulus (grams per denier): 383
 Elongation (percent): 4.2

The fiber also exhibited a low degree of shrinkage at elevated temperatures and a good retention of tenacity and tensile modulus values at temperatures up to about 150° to 200° C.

For comparative purposes Example IV was repeated with the exception that the wholly aromatic polyester formed consisted of 50 mole percent of p-oxybenzoyl moiety, 2 mole percent of 2,6-dicarboxynaphthalene moiety, 25 mole percent of p-dioxyphenylene moiety, and 23 mole percent of isophthaloyl moiety instead of 50 mole percent of p-oxybenzoyl moiety, 3 mole percent of 2,6-dicarboxynaphthalene moiety, 25 mole percent p-dioxyphenylene moiety, and 22 mole percent of isophthaloyl moiety, and the take up rate was 974 meters per minute. The resulting wholly aromatic polyester exhibited a substantially higher melting point of approximately 340° C. The as-spun fibers exhibited a denier per filament of 2.95 and the following average single filament properties:

Tenacity (grams per denier): 3.69
Tensile modulus (grams per denier): 316
Elongation (percent): 1.48

Following thermal treatment in a nitrogen stream at 230° C. for 3 hours and 250° C. for 16 hours the fiber exhibited the following average single filament properties:

Tenacity (grams per denier): 10.4
Tensile modulus (grams per denier): 301
Elongation (percent): 3.4

EXAMPLE V

Example III was substantially repeated with the exception that the following ingredients were charged to the flask:
 a. 54.04 grams p-acetoxybenzoic acid (0.30 mole)
 b. 5.19 grams 2,6-naphthalene dicarboxylic acid (0.024 mole)
 c. 29.13 grams hydroquinone diacetate (0.15 mole)
 d. 20.93 grams isophthalic acid (0.126 mole),
and the resulting as-spun fiber was taken up at a rate of 416 meters per minute.

When the product was subjected to differential scanning calorimetry, it exhibited a sharp endotherm at about 278° C. (peak), which repeats at about 278° C. on subsequent remelt scans. The polymer melt is thermotropic.

Following melt extrusion the resulting as-spun wholly aromatic polyester fiber exhibited a denier per filament of 6.12 and the following average single filament properties:

Tenacity (grams per denier): 8.42
Tensile modulus (grams per denier): 430
Elongation (percent): 2.94

Following thermal treatment in a nitrogen stream at 230° C. for 3 hours, and 250° C. for 16 hours, while the ends of the fiber were retained at fixed points corresponding to the length of the as-spun fiber, the fiber exhibited the following average single filament properties:

Tenacity (grams per denier): 17.3
Tensile modulus (grams per denier): 385
Elongation (percent): 4.6

The fiber also exhibited a low degree of shrinkage at elevated temperatures and a good retention of tenacity and tensile modulus values at temperatures up to about 150° to 200° C.

EXAMPLE VI

Example III was substantially repeated with the exception that the following ingredients were charged to the flask:
a. 54.04 grams p-acetoxybenzoic acid (0.30 mole)
b. 6.49 grams 2,6-naphthalene dicarboxylic acid (0.03 mole)
c. 29.13 grams hydroquinone diacetate (0.15 mole)
d. 19.94 grams isophthalic acid (0.12 mole),
and the resulting as-spun fiber was taken up at a rate of 150 meters per minute.

When the product was subjected to a differential scanning calorimetry, it exhibited a sharp endotherm at about 263° C. (peak), which repeats at about 263° C. on subsequent remelt scans. The polymer melt is thermotropic.

Following melt extrusion the resulting as-spun wholly aromatic polyester fiber exhibited a denier per filament of 16.9 and the following average single filament properties:

Tenacity (grams per denier): 6.90
Tensile modulus (grams per denier): 369
Elongation (percent): 2.63

Following thermal treatment in a nitrogen stream at 230° C. for 3 hours and 250° C. for 16 hours, while the ends of the fiber were retained at fixed points corresponding to the length of the as-spun fiber, the fiber exhibited the following average single filament properties:

Tenacity (grams per denier): 21
Tensile modulus (grams per denier): 341
Elongation (percent): 6.2

The fiber also exhibited a low degree of shrinkage at elevated temperatures and a good retention of tenacity and tensile modulus values at temperatures up to about 150° to 200° C.

EXAMPLE VII

Example III was substantially repeated with the exception that the following ingredients were charged to the flask:
a. 54.04 grams p-acetoxybenzoic acid (0.30 mole)
b. 16.21 grams 2,6-naphthalene dicarboxylic acid (0.075 mole)
c. 29.13 grams hydroquinone diacetate (0.15 mole)
d. 12.46 grams isophthalic acid (0.075 mole),
and the resulting as-spun fiber was taken up at a rate of 500 meters per minute.

When the product was subjected to differential scanning calorimetry, it exhibited a large sharp endotherm at about 262° C. (peak), which repeats at about 262° C. on subsequent remelt scans. The polymer melt is thermotropic.

Following melt extrusion the resulting as-spun wholly aromatic polyester fiber exhibited a denier per filament of 3.97 and the following average single filament properties:

Tenacity (grams per denier): 8.00
Tensile modulus (grams per denier): 385
Elongation (percent): 3.01

Following thermal treatment in a nitrogen stream at 230° C. for 3 hours, and 250° C. for 16 hours while the ends of the fiber were retained at fixed points corresponding to the length of the as-spun fiber, the fiber exhibited the following average single filament properties:

Tenacity (grams per denier): 20.0
Tensile modulus (grams per denier): 311
Elongation (percent): 5.5

The fiber also exhibited a low degree of shrinkage at elevated temperatures and a good retention of tenacity and tensile modulus values at temperatures up to about 150° to 200° C.

Although the invention has been described with preferred embodiments it is to be understood that variations and modifications may be employed without departing from the concept of the invention as defined in the following claims.

We claim:
1. An improved melt processable wholly aromatic polyester capable of forming a thermotropic melt phase at a temperature below approximately 300° C. consisting essentially of the recurring moieties I, II, III, and IV wherein:

I is 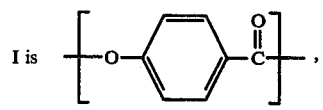

II is 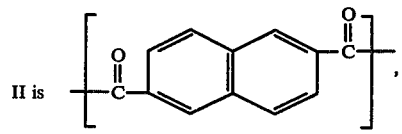

III is a symmetrical dioxy aryl moiety of the formula $$+O-Ar-O+$$

where Ar is a divalent radical comprising at least one aromatic ring, and

IV is selected from the group consisting of (a) 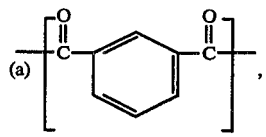

(b) 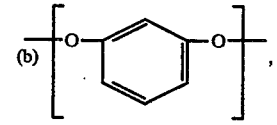

and mixtures of (a) and (b),
and wherein said polyester comprises approximately 20 to 70 mole percent of moiety I, approximately 3 to 30 mole percent of moiety II, approximately 7.5 to 40 mole percent of moiety III, and approximately 4 to 30 mole percent of moiety IV, and wherein each of said moieties is free of ring substitution.

2. An improved melt processable wholly aromatic polyester according to claim 1 which is capable of forming a thermotropic melt phase below approximately 280° C.

3. An improved melt processable wholly aromatic polyester according to claim 1 wherein said symmetrical dioxy aryl moiety is selected from the group consisting of:

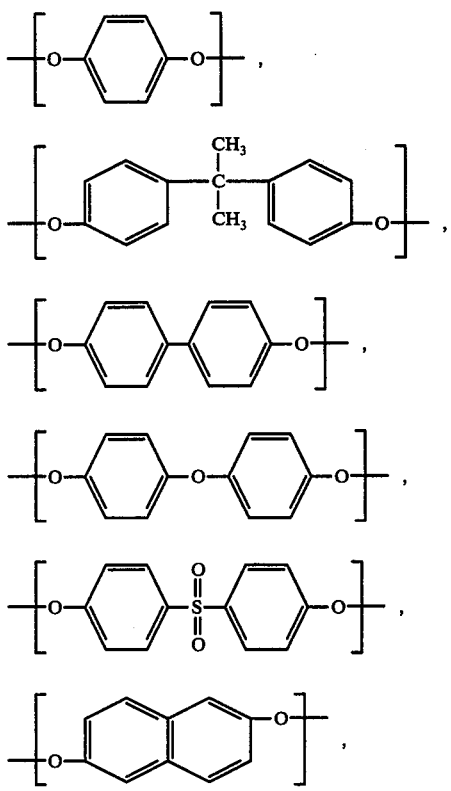

and mixtures of the foregoing.

4. An improved melt processable wholly aromatic polyester according to claim 1 wherein moiety IV is

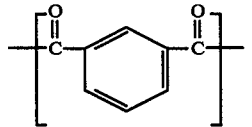

5. A fiber which has been melt spun from the wholly aromatic polyester of claim 1.

6. A fiber which has been melt spun from the wholly aromatic polyester of claim 1 and subsequently thermally treated.

7. An improved melt processable wholly aromatic polyester capable of forming a thermotropic melt phase at a temperature below approximately 300° C. consisting of the recurring moieties I, II, III, and IV wherein:

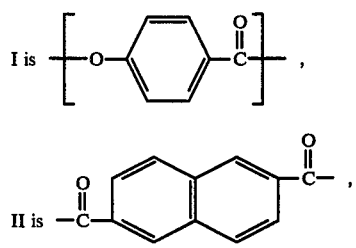

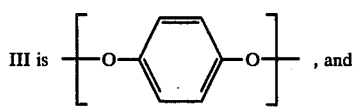

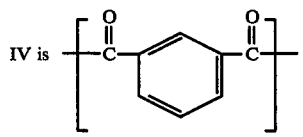

and wherein said polyester comprises approximately 40 to 60 mole percent of moiety I, approximately 3 to 15 mole percent of moiety II, approximately 20 to 30 mole percent of moiety III, and approximately 10 to 27 mole percent of moiety IV.

8. A fiber which has been melt spun from the wholly aromatic polyester of claim 7.

9. A fiber which has been melt spun from the wholly aromatic polyester of claim 7 and subsequently thermally treated.

10. An improved melt processable wholly aromatic polyester capable of forming a thermotropic melt phase at a temperature below approximately 300° C. consisting essentially of the recurring moieties I, II, III, and IV wherein:

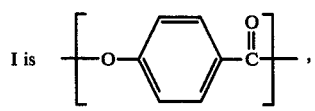

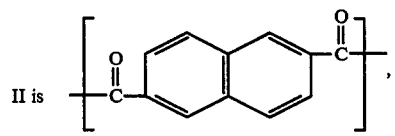

(a) III is a symmetrical dioxy aryl moiety of the formula $+O-Ar-O+$ where Ar is a divalent radical comprising at least one aromatic ring, and IV is selected from the group consisting of

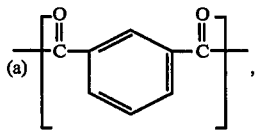

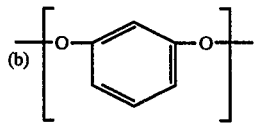

and mixtures of (a) and (b), and wherein said polyester comprises approximately 40 to 70 mole percent of moiety I, approximately 7.5 to 30 mole percent of moiety II, approximately 7.5 tp 30 mole percent of moiety III, and approximately 4 to 20 mole percent of moiety IV, and wherein each moiety of said polyester is free of ring substitution.

11. An improved melt processable wholly aromatic polyester according to claim 10 which is capable of forming a thermotropic melt phase below approximately 280° C.

12. An improved melt processable wholly aromatic polyester according to claim 10 wherein said symmetrical dioxy aryl moiety is selected from the group consisting of:

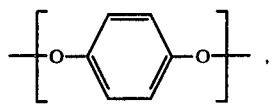

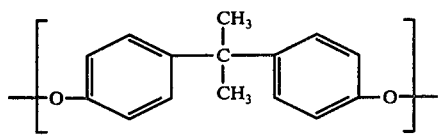

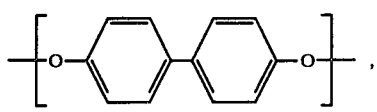

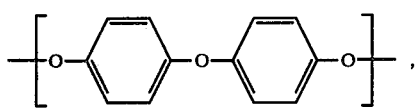

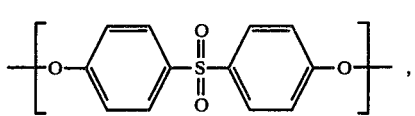

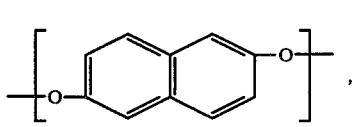

and mixtures of the foregoing.

13. An improved melt processable wholly aromatic polyester according to claim 10 wherein moiety IV is

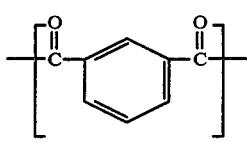 (a)

14. A fiber which has been melt spun from the wholly aromatic polyester of claim 10.

15. A fiber which has been melt spun from the wholly aromatic polyester of claim 10, and subsequently thermally treated.

16. An improved melt processable wholly aromatic polyester capable of forming a thermotropic melt phase at a temperature below approximatey 300° C. consisting of the recurring moieties I, II, III, and IV wherein:

I is 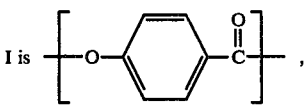,

II is 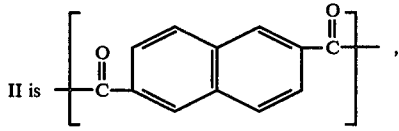,

III is , and

IV is selected from the group consisting of (a) 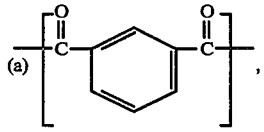, (b) 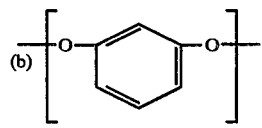, and mixtures of (a) and (b),
and wherein said polyester comprises approximately 40 to 70 mole percent of moiety I, approximately 7.5 to 30 mole percent of moiety II, approximately 7.5 to 30 mole percent of moiety III, and approximately 4 to 20 mole percent of moiety IV.

17. An improved melt processable wholly aromatic polyester according to claim 16 wherein moiety IV is

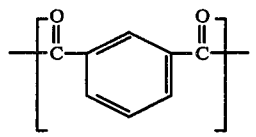 (a)

18. An improved melt processable wholly aromatic polyester according to claim 17 which consists of approximately 60 mole percent of moiety I, approximately 10 mole percent of moiety II, approximately 20 mole percent of moiety III, and approximately 10 mole percent of moiety IV.

19. An improved melt processable wholly aromatic polyester according to claim 16 wherein moiety IV is

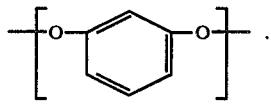 (b)

20. An improved melt processable wholly aromatic polyester according to claim 19 which consists of approximately 60 mole percent of moiety I, approximately 20 mole percent of moiety II, approximately 15 mole percent of moiety III, and approximately 5 mole percent of moiety IV.

21. A fiber which has been melt spun from the wholly aromatic polyester of claim 16 and subsequently thermally treated, which exhibits an average single filament tenacity of at least 15 grams per denier and an average single filament tensile modulus of at least 300 grams per denier measured at ambient conditions.

22. A fiber according to claim 21 which has been thermally treated in an inert atmosphere.

23. A fiber according to claim 21 which has been thermally treated in an oxygen-containing atmosphere.